US012488707B2

(12) United States Patent
Kreidler et al.

(10) Patent No.: US 12,488,707 B2
(45) Date of Patent: Dec. 2, 2025

(54) SECURITY SEAL

(71) Applicant: J.J. Keller & Associates, Inc., Neenah, WI (US)

(72) Inventors: Jason Jon Kreidler, Sheboygan, WI (US); Kevin Roger Kucksdorf, Hortonville, WI (US); Benjamin Luke Burleson, College Station, TX (US); Cory Brent Christofferson, Cloquet, MN (US); Joel Clark, Sherwood, WI (US)

(73) Assignee: J. J. Keller & Associates, Inc., Neenah, WI (US)

( * ) Notice: Subject to any disclaimer, the term of this patent is extended or adjusted under 35 U.S.C. 154(b) by 158 days.

(21) Appl. No.: 18/216,823

(22) Filed: Jun. 30, 2023

(65) Prior Publication Data

US 2025/0006084 A1 Jan. 2, 2025

(51) Int. Cl.
*G09F 3/03* (2006.01)

(52) U.S. Cl.
CPC .................................. *G09F 3/0311* (2013.01)

(58) Field of Classification Search
CPC ........ G09F 3/03; G09F 3/0305; G09F 3/0311; G09F 3/037; G09F 3/0347; G09F 3/0352; G09F 3/0358; G09F 3/0323; Y10T 292/48; Y10T 292/491; Y10T 292/499; Y10T 292/505; Y10T 292/507; Y10T 292/509; Y10T 292/50
USPC ........................................................ 24/16 PB
See application file for complete search history.

(56) References Cited

U.S. PATENT DOCUMENTS 4,229,031 A * 10/1980 Guiler .................... G09F 3/0358 292/322
4,319,776 A * 3/1982 Moberg ................ G09F 3/0358 292/322
4,609,218 A * 9/1986 Chevillard ............ G09F 3/0323 292/320
4,946,210 A * 8/1990 Fuehrer ................. G09F 3/0352 292/DIG. 60
5,056,837 A * 10/1991 Fuehrer .............. B65D 63/1081 292/307 R (Continued)

FOREIGN PATENT DOCUMENTS

CA 2133395 C 3/1996
DE 2342681 A1 * 3/1974

(Continued)

OTHER PUBLICATIONS

Computer Generated Translation for EP 1465137, Generated on Jan. 30, 2025, https://worldwide.espacenet.com/ (Year: 2025).*

(Continued)

*Primary Examiner* — Alyson M Merlino
(74) *Attorney, Agent, or Firm* — Wong Meyer Smith & McConnell

(57) ABSTRACT

A security seal including a receptacle, a tip and a middle portion therebetween. The receptacle includes a bore with an entrance end and an exit end, at least one tab extending into the bore and an end plate having thereon a saddle. The tip has a cutout therein. The tip is insertable into the receptacle bore and engageable with the at least one tab. The end plate is moveable with a living hinge to block the exit end of the bore and to insert the saddle into the cutout.

20 Claims, 4 Drawing Sheets

(56) References Cited

U.S. PATENT DOCUMENTS

| | | | | | |
|---|---|---|---|---|---|
| 5,123,686 | A * | 6/1992 | Wenk | B65D 77/185 | |
| | | | | 292/307 R | |
| 5,969,613 | A * | 10/1999 | Yeager | E05B 73/0017 | |
| | | | | 340/568.1 | |
| 10,366,632 | B1 * | 7/2019 | Tropper | G09F 3/037 | |

FOREIGN PATENT DOCUMENTS

| | | | | | |
|---|---|---|---|---|---|
| EP | 0634735 | A1 * | 1/1995 | G09F 3/0311 |
| EP | 1465137 | A2 * | 10/2004 | G09F 3/0352 |
| EP | 2329482 | B1 | 1/2016 | |
| FR | 2712716 | A1 * | 5/1995 | G09F 3/0311 |
| FR | 2948806 | B1 | 9/2011 | |
| PT | 105231 | B | 9/2011 | |
| WO | 2013038321 | A4 | 5/2013 | |
| WO | 2014107819 | A1 | 7/2014 | |
| WO | 2018/124870 | A1 | 7/2018 | |

OTHER PUBLICATIONS

J.J. Keller & Associates, Inc.; "Cambridge Plastic Truck Seals"; https://www.jkeller.com/Category/shop-security-seals—(4) pages.

* cited by examiner

SECURITY SEAL

FIELD OF THE INVENTION

The invention relates to a security seal and, more preferably, to a one-piece security seal having a tail end, a receptacle end and a middle portion therebetween.

BACKGROUND OF THE INVENTION

Plastic seals are used extensively within the trucking industry and do not vary significantly from vendor to vendor, with the primary market advantage being cost. The purpose of a plastic seal is generally to provide tamper evidence by breaking in a designed way when the cargo is accessed by anyone. The seal has a unique identifier and cannot be resealed once broken, providing immediate visual evidence that the load has been opened, or at the very least tampered with.

When a load is transported, tampering and theft are always concerns. While current seal designs generally deter theft by providing tamper evidence, it is conceivable that there are ways to bypass the tamper evident features of market seals by spinning the seal tip in its sealed position, or pulling the seal tail in different directions when it is in the sealed position, causing the seal tip to move side-to-side in the receptacle. When security seals on the market are tested for failure modes, some fail before their rated strengths when the seal tail is pulled in various directions.

SUMMARY OF THE INVENTION

In one construction, the disclosure provides a security seal having a receptacle including a bore with an exit end, at least one tab extending into the bore and an end plate having thereon a saddle; a tip having a cutout therein; and a middle portion between the receptacle and the tip, wherein the tip is insertable into the bore and engageable with the at least one tab and wherein the end plate is moveable with a living hinge to block the exit end and to insert the saddle into the cutout.

In another construction, the disclosure provides a one-piece security seal having: a tip having a slot; a middle portion; and a receptacle having a bore, at least one tab extending into the bore and an end plate, the bore having an exit end and the end plate having thereon a saddle; wherein the security seal has an open position wherein the tip is not positioned in the receptacle and the end plate is not positioned in the exit end and wherein the security seal has a closed position where the tip is positioned in the bore such that the saddle is housed in the slot, the end plate closes off the exit end and the tip is prevented from moving axially or radially within the bore.

In another construction, the disclosure provides a security seal having a one-piece plastic seal having a tail portion, a receptacle portion, and a middle portion therebetween, wherein the tail portion includes a tip having a rectangular portion and having a slot and wherein the receptacle portion includes a receptacle and a cap, the receptacle having a bore and having extensions extending inwardly into the bore adapted to engage with the rectangular portion of the tip, the cap having a saddle, and the cap adapted to be moved into an orientation such that the saddle is positioned in the slot and such that the cap closes off an end of the bore.

In another construction, the disclosure provides a security seal having a receptacle including a bore having an exit end and including a cap having a saddle; a tip having a slot therein; and a middle portion between the receptacle and the tip, wherein the tip is insertable into the bore and wherein the cap is moveable with a living hinge from an open position non-blocking the exit end of the bore to a closed position blocking the exit end of the bore with the saddle positioned in the slot.

In another construction, the disclosure provides a security seal having a receptacle including a bore and an end plate having thereon a saddle; a tip having a slot therein; and a middle portion between the receptacle and the tip, wherein the tip is positionable into the bore such that the saddle is positioned in the slot to prevent movement of the tip in the bore.

Other aspects of the disclosure will become apparent by consideration of the detailed description and accompanying drawings.

DETAILED DESCRIPTION OF THE INVENTION

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

Figure 1:
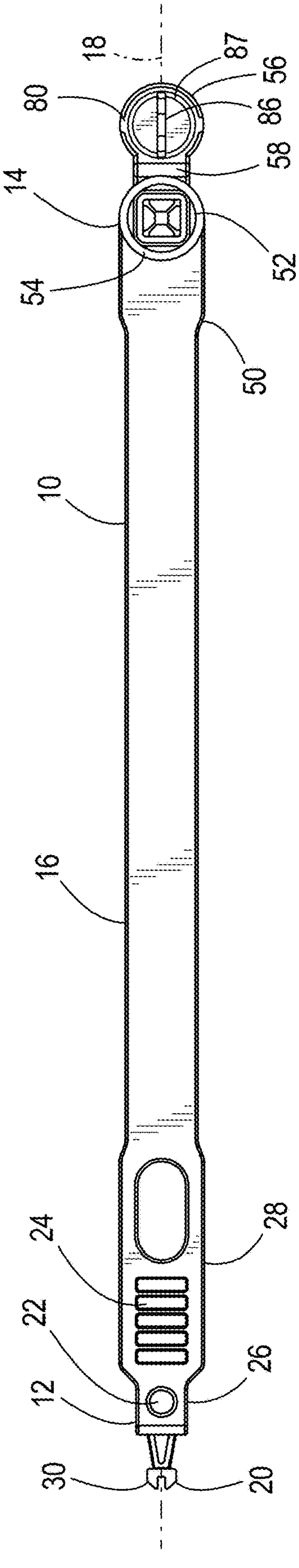
FIG. 1 is a top view of a security seal of the present invention in an open position.

FIG. 1 illustrates a security seal 10. The security seal 10 is shown as and is preferably one-piece and preferably molded of plastic, however, it should be noted that any other number of pieces and other materials can also be utilized. The security seal 10 can be fabricated as is known in the art from plastic such as high density polyethylene for example. As one-piece, the security seal maintains and improves upon the security and tamper evident features of common two and three piece designs as will be discussed below. A one-piece security seal with additional security and anti-tamper features provides an effective security seal while reducing manufacturing costs.

The security seal 10 includes a tail end 12, a receptacle end 14, a middle portion 16 therebetween and a longitudinal axis 18. The tail end 12 includes a tip 20, a break point aperture 22 as is known in the art and a plurality of ridges 24. The tip 20 is adjacent to a narrow portion 26 which includes the break point aperture 22. The ridges 24 are on a wider portion 28 which is adjacent to the narrower middle portion 16.

Figure 4:
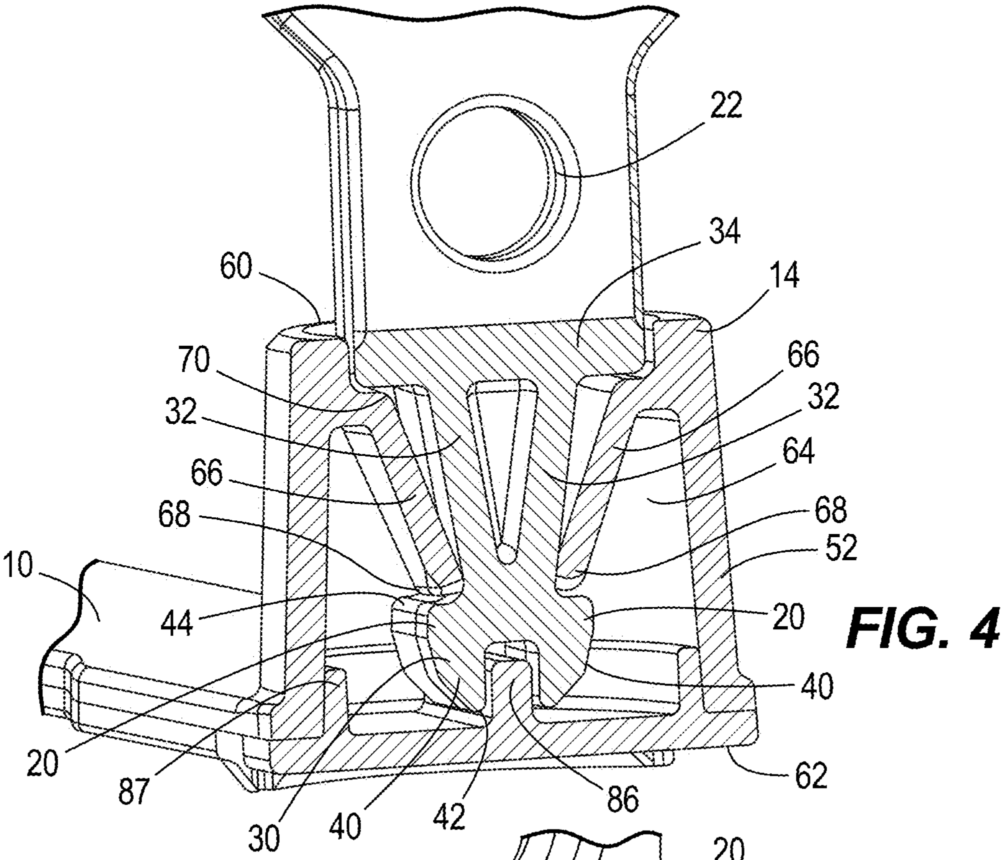
FIG. 4 is a sectional view of the receptacle end in the closed position.
Figure 5:
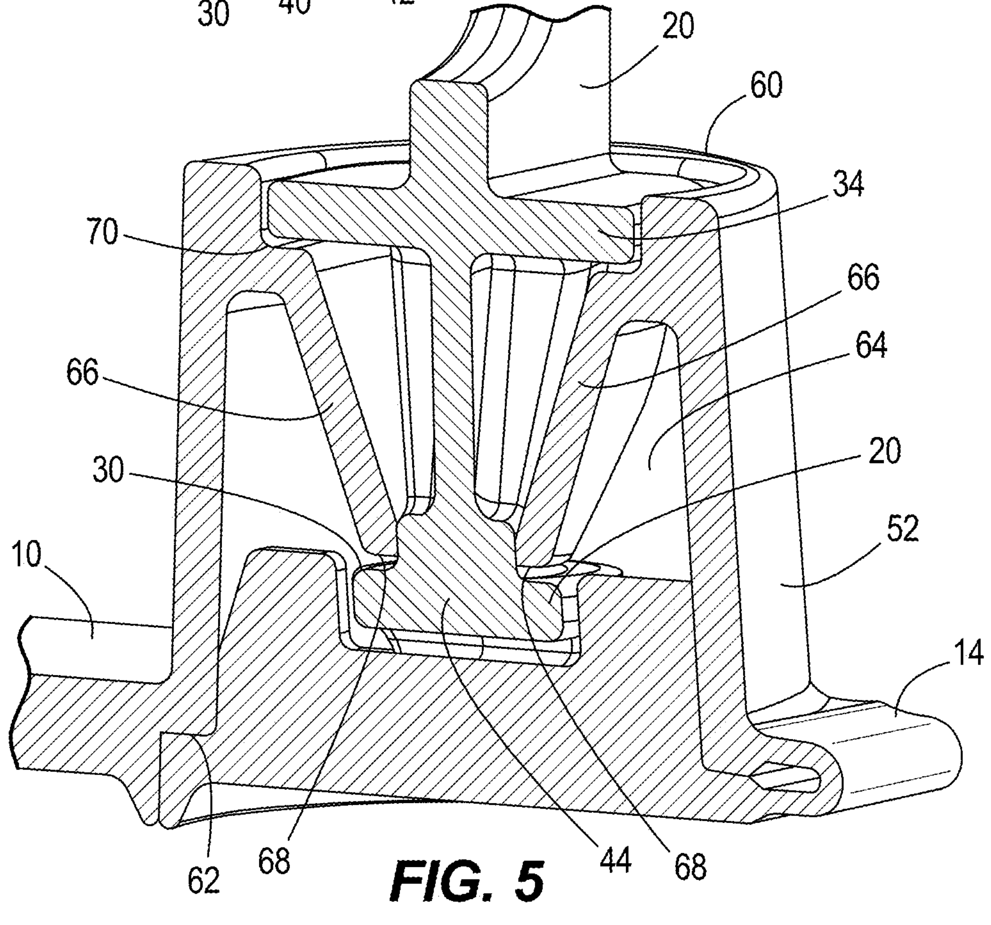
FIG. 5 is a sectional view of the receptacle end in the closed position.

As best shown in FIGS. 4 and 5, the tip 20 includes a head 30, a pair of struts 32 adjacent to the head 30, and a rectangular end wall 34 adjacent to the struts 32. The head 30 includes two arms 40, a slot or cutout 42 therebetween and a base 44. The base 44 is preferably rectangular in that a rectangular shape is a security feature as it prevents the tail end 12 from rotating around the longitudinal axis 18 as will be explained in more detail below.

Referring back to FIG. 1, the break point aperture 22 is shown as circular, however other shapes such as for example rectangular or a shape with vertices can also be utilized.

The ridges 24 are preferable triangular shaped in cross-section, however other shapes can also be utilized. The ridges 24 are designed to provide a texture to aid the inserting of the tip 20 into the receptacle end 14.

The middle portion 16 is generally rectangular with a unform width, however, other shapes and widths can also be utilized.

The receptacle end 14 includes a wide portion 50, a receptacle 52 adjacent to the wide portion 50 and preferably secured to the wide portion 50 with a welding ridge 54 and terminates in a moveable saddle portion 56 which is connected to the receptacle 52 with a living hinge 58.

With reference to FIGS. 2-5, the receptacle 52 is shown. The receptacle includes a generally circular entrance end 60, a generally circular termination end 62 and a generally cylindrical bore 64 therebetween. Adjacent to the entrance end 60 are four generally rectangular extensions or tabs 66 which extend into the bore 64. It should be noted that any other number of tabs 66 and any other shapes other than generally triangular can also be utilized. The tabs 66 terminate in an end surface 68. A circular shoulder 70 is positioned between the entrance end 60 and the tabs 66.

Figure 2:
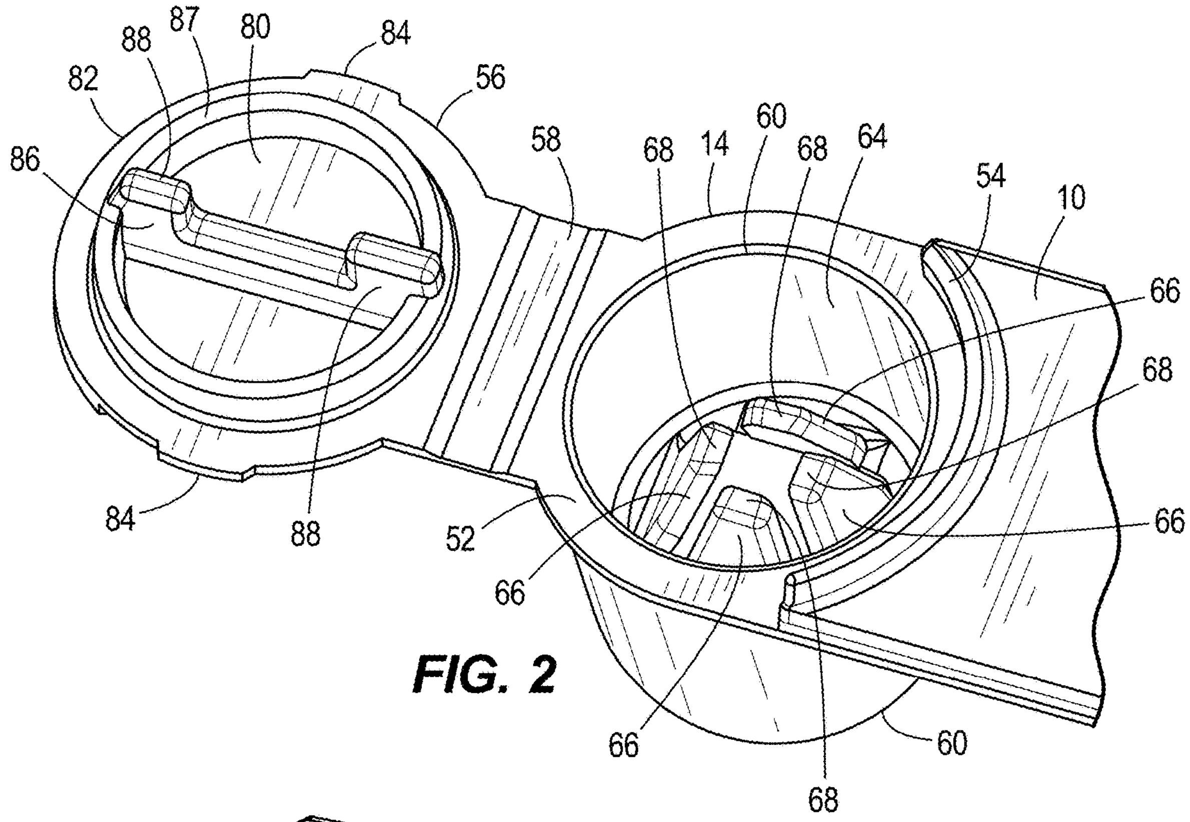
FIG. 2 is a perspective view of a receptacle end of the security seal in an open position.
Figure 3:
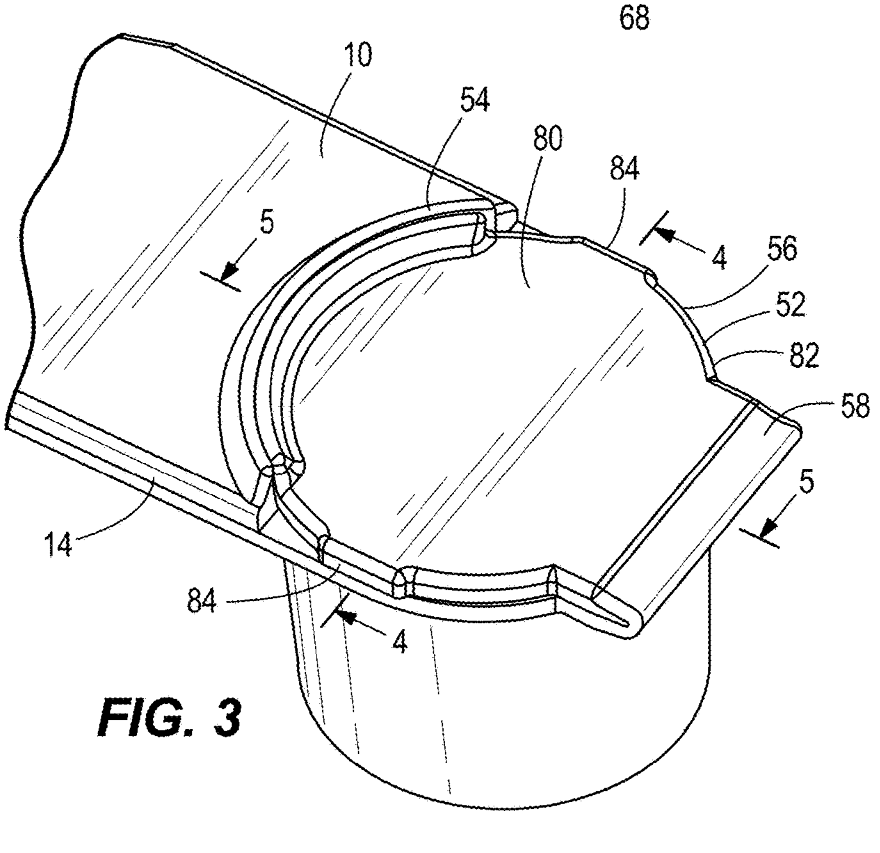
FIG. 3 is a perspective view of the receptacle end of the security seal in a closed position.

With reference to FIGS. 2 and 3, the saddle portion 56 is shown. The saddle portion 56 is connected to the receptacle 52 with the living hinge 58, however, other types of connections and hinges can also be utilized. The saddle portion 56 includes a generally circular cap or end plate 80 having a periphery 82, the periphery 82 includes two shoulders 84. The saddle portion 56 has molded therein on one surface a saddle 86 and a curved wall such as cylindrical wall 87. The saddle 86 is generally rectangle and is oriented in line with the longitudinal axis 18. The saddle 86 includes two raised end caps 88. The living hinge 58 enables the saddle portion 56 to be moved, such as by pivoting. Preferably, the pivoting of the saddle portion 56 and subsequent welding in place is completed by a manufacturer or other third party, however, it can also be done by the user. The saddle portion 56 has an open position as shown in FIG. 2 and a closed position as shown in FIG. 3. In the closed position, the saddle portion 56 is welded to the welding ridge 54 as is known in the art with the two shoulders 84 on the plate 80 engaging with the welding ridge 54 to hold the saddle portion 56 in the closed position and the saddle 86 and cylindrical wall 87 both extend into the receptacle bore 64 as shown in FIGS. 4 and 5. In the closed position, the cylindrical wall 87 provides an interference fit between the cap 80 and the receptacle 52. The cylindrical wall 87 provides tamper prevention by creating a labyrinth to prevent exploiting any seams in the security seal 10.

Continuing to refer to FIGS. 4 and 5, in the closed position, the tip 20 extends into the receptacle 52. As a user inserts the head 30 into the receptacle 52 at the entrance end 60, the head 30 deforms the tabs 66 outwardly allowing the head 30 to pass through the bore 64 and come to rest adjacent to the termination end 62 of the bore 64. In this position, the base 34 of the head 30 is seated against the circular shoulder 70 of the receptacle 52, the struts 32 are positioned inwardly of the tabs 66, and the end surfaces 68 of the tabs 66 abut the base 44 of the head 30. The base 44 of the head 30 which extends outwardly of the tabs 66 and prevents the head 30 from being removed from the receptacle 52. In this position, the saddle 86 is oriented in the cutout 42 of the head 30 which keeps the head 30 in place and prevents rotation movement of the tail end 12 about the longitudinal axis 18 and is a tamper proof feature. In the closed position, the only point of failure of the security seal 10 is the break point aperture 22.

Figure 6:
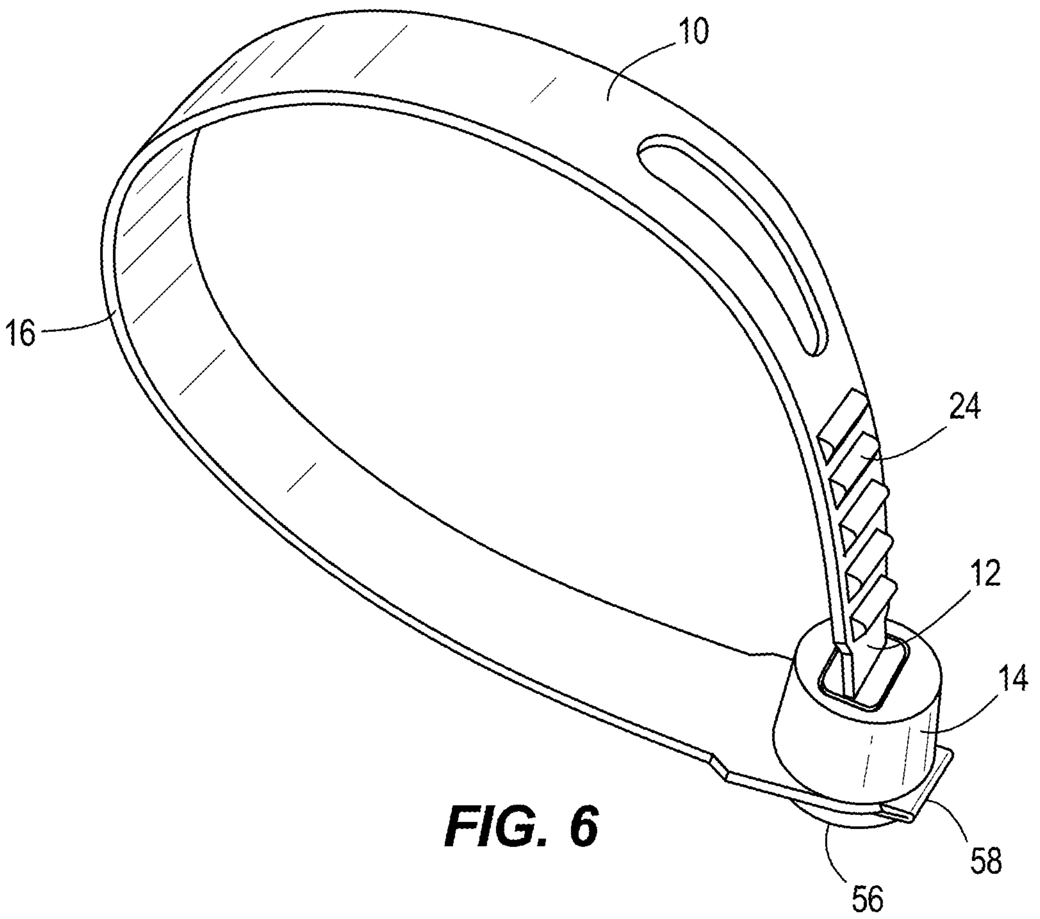
FIG. 6 is a perspective view of the security seal in the closed position.

In operation and referring to FIGS. 1 and 6, a user picks up a security seal 10 and loops it around the article to be secured such as a hasp (not shown) for example. To secure the security seal 10 in place, the head 30 is inserted into the receptacle 52 into the closed position of FIG. 6. The plate 80 of the saddle portion 56 either has been or needs to be pivoted about the living hinge 58 and seated against the welding ridge 54. The moveable saddle portion 56 eliminates the need for the insertion of another piece into the receptacle 52 and also eliminates the need for an additional piece to seal the termination end 62 of the receptacle 52. In the closed position, the tip 20 is prevented from moving longitudinally or radially within the bore 64.

The single piece security seal 10 has anti-tamper features found in multiple piece security seals. The saddle 86 engaging with the head 30 prevents both side-to-side and rotational movement. The living hinge 58 enables the saddle portion 86 to be molded while maintaining a single piece design. The rectangular shape of the tip 20 engaging with the tabs 66 is a further anti-tamper feature.

Various features and advantages of the invention are set forth in the following claims.

What is claimed is:

1. A security seal comprising:

a receptacle including a bore, at least one tab extending into the bore, and a saddle portion, the saddle portion including an end plate and a rectangular saddle positioned on the end plate and extending into the bore;

a tip having a rectangular cutout therein and a pair of arms defining the cutout therebetween;

and a middle portion between the receptacle and the tip, wherein the tip is insertable into the bore to be engageable with the at least one tab to prevent longitudinal movement of the tip in the bore and to be positionable in the bore such that the cutout engages with the rectangular saddle on the end plate to prevent rotational movement of the tip within the bore.

2. The security seal of claim 1 wherein the security seal is one-piece.

3. The security seal of claim 1 wherein the bore is cylindrically shaped.

4. The security seal of claim 1 wherein the at least one tab includes a plurality of triangularly shaped tabs.

5. A one-piece security seal comprising:

a tip which terminates in a rectangularly shaped slot;

a middle portion; and a receptacle having at least one wall that defines a bore, at least three tabs extending into the bore, and an end plate, the end plate being connected to the at least one wall and moveable relative to the bore and having thereon a saddle, wherein the security seal has an open position, in which the tip is not positioned in the bore, and wherein the security seal has a closed position, in which the tip is positioned in the bore and the end plate is moved such that the saddle is positioned in the bore and such that the slot at least partially surrounds the saddle so that the tip is prevented from moving radially within the bore.

6. The one-piece security seal of claim 5 wherein the tip further includes a pair of arms defining the slot therebetween.

7. The one-piece security seal of claim 5 wherein the bore is cylindrically shaped.

8. The one-piece security seal of claim 5 wherein the end plate is integral with the at least one wall via a hinge and is moveable from the open opposition to the closed position by the hinge.

9. The one-piece security seal of claim 5 wherein the end plate is integral with the at least one wall via a living hinge and is moveable from the open position to the closed position by the living hinge.

10. The one-piece security seal of claim 5 wherein the end plate is circularly shaped.

11. The one-piece security seal of claim 5 wherein the saddle is rectangularly shaped.

12. The one-piece security seal of claim 5 wherein the end plate has a curved wall thereon and when the security seal is in the closed position, the curved wall is positioned in the bore.

13. A security seal comprising:

a one-piece plastic seal having a cap, a tail portion, a receptacle portion, and a middle portion located between the tail portion and the receptable portion;

wherein the tail portion is movable into a bore of the receptacle portion and the tail portion includes a tip, which terminates in a rectangularly shaped slot, wherein the bore is adapted to receive the tip and the bore includes an exit end, wherein the cap has a rectangular saddle, and the cap is adapted to be moved to close the exit end of the bore, and wherein when the tip is received in the bore and the cap closes the exit end of the bore, the saddle is positioned in the slot to prevent rotational movement of the tip in the bore.

14. The security seal of claim 13 wherein the tip further includes a pair of arms defining the slot therebetween, a base, at least one strut and an end wall.

15. The security seal of claim 13 wherein the bore is cylindrically shaped.

16. The security seal of claim 13 and further including extensions extending inwardly into the bore adapted to engage with the rectangular portion of the tip, wherein the extensions are triangularly shaped.

17. The security seal of claim 16 wherein the extensions includes at least four extensions.

18. The security seal of claim 13 wherein the cap is connected to the bore with a living hinge.

19. The security seal of claim 13 wherein the cap is circularly shaped.

20. The security seal of claim 13 wherein the cap has thereon a cylindrical wall.

* * * * *